United States Patent [19]

Thompson

[11] 4,165,131
[45] Aug. 21, 1979

[54] CAST VEHICLE WHEELS

[75] Inventor: Joseph A. Thompson, Stourbridge, England

[73] Assignee: GKN Kent Alloys Limited, England

[21] Appl. No.: 813,571

[22] Filed: Jul. 7, 1977

Related U.S. Application Data

[63] Continuation-in-part of Ser. No. 628,961, Nov. 5, 1975, abandoned.

[51] Int. Cl.² .................................................. B60B 1/06
[52] U.S. Cl. ............................. 301/65; 164/DIG. 14; 249/56
[58] Field of Search ............... 301/6 CS, 6 WB, 65 B, 301/66, 67, 79, 80, 95–98, 63 R, 63 PW; 152/375, 378 R; 164/DIG. 14, 58, 92; 249/56; 29/159 R, 159.01, 159.1; 295/8, 27, 28

[56] References Cited

U.S. PATENT DOCUMENTS

| 907,991 | 12/1908 | Goodfellow | 301/65 |
|---|---|---|---|
| 2,631,897 | 3/1953 | Ewart | 301/65 |
| 3,659,901 | 5/1972 | Porsche et al. | 301/65 |
| 3,964,144 | 6/1976 | Kopp | 29/159.1 |

FOREIGN PATENT DOCUMENTS 347446  8/1960  Switzerland ..................... 301/63 R Primary Examiner—Robert J. Spar
Assistant Examiner—H. Grant Skaggs
Attorney, Agent, or Firm—Leydig, Voit, Osann, Mayer & Holt, Ltd.

[57] ABSTRACT

A light-alloy vehicle wheel comprises a nave, a wheel disc with ventilation apertures, two opposed tire bead seats and a well lying between the bead seats. A plurality of external, equally-spaced webs extends between the outer face of the wheel disc and one of the tire bead seats on its outer face and a corresponding plurality of internal fillets lie between adjacent ventilation apertures. Each fillet has an inwardly-directed face preferably of convex cross-section such that the corners of the cross-section defining the adjacent ventilation apertures are closer to the neutral axis of the local cross-section of the wheel disc, than the convex face of the fillet.

4 Claims, 11 Drawing Figures

CAST VEHICLE WHEELS

CROSS-REFERENCE TO RELATED APPLICATION

This application is a continuation-in-part of application Ser. No. 628,961 (now abandoned) filed Nov. 5, 1975 in the name of the same applicant.

BACKGROUND OF THE INVENTION

1. Field of the Invention

This invention relates to cast vehicle wheels and particularly, but not exclusively, to vehicle wheels of diecast light alloy intended for use in heavy-goods and large passenger vehicles.

2. Summary of the Prior Art

High loads and high speeds have of recent times resulted in the necessity for the provision of truck, bus and coach wheels of ever-increasing strength in order to resist over long periods of use, a very large number of stress reversals in certain parts of the wheel structure and in order to achieve this, steel wheels of ever greater weight have become necessary.

This increase in weight gives rise to a number of disadvantages including increased tare weight of the vehicle, more difficult handling under maintenance conditions and higher inertia under running conditions. The latter effect is particularly undesirable on steerable wheels since the effort required to overcome the gyroscopic effect is directly related to the weight of those wheels and a significant amount of power is absorbed by power-steering systems which is disadvantageous, particularly if the engine is operating at lower speeds during negotiation of a curve.

It has already been proposed to meet these difficulties by the provision of wheels of cast light alloy such as aluminum, but although weight saving is achieved with such wheels this is not as great as is desirable since light alloys are, like other metals, liable to fatigue fracture as a result of stress reversals and the thickness of the wheel has to be greater than is desirable.

Furthermore, in order to avoid over-heating of braking systems, it is necessary that air should be allowed to circulate freely or even be forced over and around the corresponding brake drum or brake disc and this necessitates the provision of apertures of substantial size in the disc portion of a wheel outwardly of the nave. The apertures should be as large as possible to provide for good airflow, but should be as small as possible to avoid weakening of the disc structure. It has been found that even if the apertures are to provide no more than adequate air cooling, the material remaining between the apertures, which can be equated to spokes, is insufficient to prevent fatigue cracks developing. Quite clearly such a possibility cannot be allowed.

SUMMARY OF THE INVENTION

According to the present invention I provide a cast vehicle wheel comprising: a wheel centre comprising a nave having apertures to enable the wheel to be secured to a vehicle hub, and an inclined section extending generally outwardly from the nave and consisting essentially of T-section spokes separated by vent holes; and a rim portion having a well extending from the outer periphery of said inclined section and two tyre bead seat portions spaced apart by the well; each said T-section spoke comprising a web extending between the outer face of said inclined section and the adjacent one of the said tyre bead seat portions, said web forming the stem of the T, and, forming part of the cross-member of the T, an integral fillet located on the inner face of said inclined section so that the cross-member of the T is thicker at its middle than at its ends which are located at two adjacent vent holes.

The term "fillet" as used herein is intended to mean a narrow strip of metal integral with and raised above the general level of a metal surface so that the metal thickness of the fillet is greater than that of the metal adjacent the fillet.

The term "neutral axis" as used herein has its generally accepted meaning, namely an imaginary line at any section of a member under bending load where the stress is zero or in other words both the tensile and compressive forces are zero along this line. The further any given point in a cross-section lies from the neutral axis the higher the stress.

Preferably, the wheel incorporates a further plurality of webs extending radially inwardly from the bead seat portion opposite to the bead seat portion associated with the first-mentioned webs. The further webs ensure that the strength of the bead seat portions is approximately equalized thereby avoiding substantial inequality in the stresses generated in the two bead seat portions and in the well.

In a preferred construction the fillet spans the section between adjacent vent holes, at least over a part of its length. In other words the lateral boundaries of the fillet are at least partially coincident with the aforesaid corners of the cross-section which define the boundaries of the vent holes remote from the first-mentioned plurality of webs. This construction simplifies the mould tools and the ejection of castings from the moulds. From a strength standpoint however, this feature is not essential.

BRIEF DESCRIPTION OF THE DRAWINGS

A cast vehicle wheel embodying the invention will now be described, by way of example, with reference to the accompanying drawings, in which.

DESCRIPTION OF THE PREFERRED EMBODIMENTS

Figure 1:
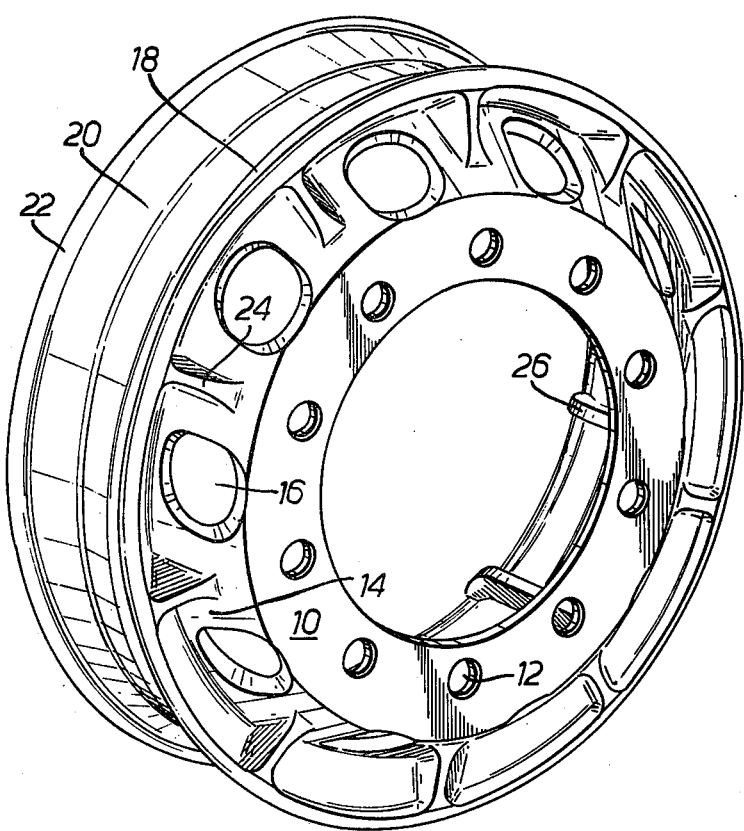
FIG. 1 is a perspective view of a vehicle wheel in accordance with the invention.
Figure 2:
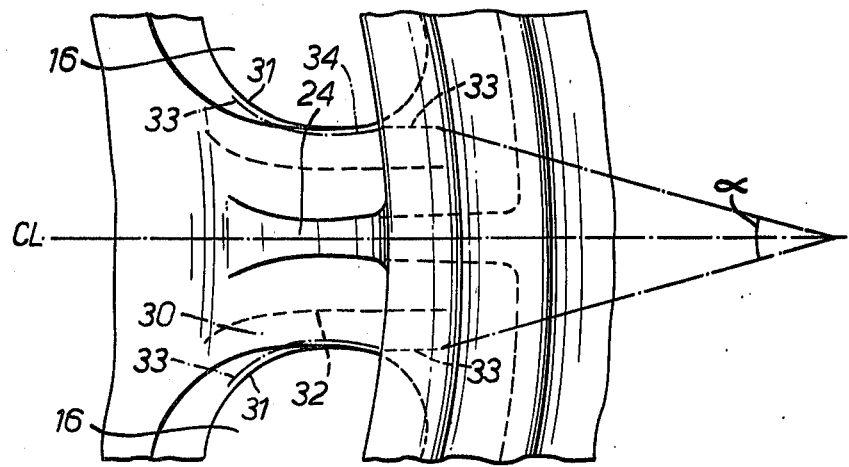
FIG. 2 is a fragmentary developed view of one section of the vehicle wheel of FIG. 1 as viewed from the direction of arrow II of FIG. 3.

As best seen in FIG. 1, the vehicle wheel centre includes an annular nave 10 having a plurality of equally-spaced stud holes 12 and an inclined section 14 having a plurality of vent holes or ventilation apertures 16 which enable the brakes (not shown) to be cooled. The vent holes in the illustrative embodiment have a shape suitable for the insertion of a hand so that when the wheels are mounted in tandem the valve of the inner wheel can be reached, but the particular shape employed may vary widely as will be discussed hereinafter. The section 14, which is approximately frusto-conical in configuration, leads directly (when considering the section of FIG. 3) to the well 18 of the wheel which itself leads to two tire bead seat portions 20 arranged on opposite sides of the rim centre line and the bead seat portions 20 each carry an outer flange 22. As will be apparent, all the sections of the wheel are integral and are joined by smooth curves. The section 14 is joined to one outer tyre bead seat portion 20 by a plurality of radially-extending disc webs 24 which alternate, circumferentially with the vent holes 16. Internally of the right-hand part of the well 18 (as viewed in FIG. 3) and tire bead seat portions 20, a plurality of reinforcing webs 26, extending generally axially and radially of the wheel, is provided, the webs 26 lying in respective common planes with corresponding disc webs 24. This arrangement ensures that the stressing of the wheel is symmetrical. These webs are of particular importance for wide wheels. Preferably said webs have a radially inward extent substantially equal to the innermost extent of the well 18, and this ensures that the stresses in the well and in both bead seat portions are approximately equal on both sides of the central plane of the wheel transverse to the rotational axis.

While the disc webs 24 and the reinforcing, internal, webs 26 are to some extent effective in stiffening and strengthening the portions of the wheel joined thereby, the section 14 requires further reinforcement if fatigue stresses are to be fully and adequately resisted. Mere thickening of the wheel thickness overall will not necessarily provide the necessary fatigue resistance and would in any event add appreciably to the weight of the wheel. Accordingly, as shown in FIGS. 2 to 5 there is provided a plurality of fillets 30 on the radially inner face of the portions of the section 14 lying symmetrically between the vent holes 16 and at positions corresponding to the positions of the disc webs 24 on the outer face. The purpose of the fillets 30 is to ensure that the maximum bending stress does not occur at the radially inner corners 31 of the section of FIG. 4, i.e., the junction between inclined faces 29 and the generally radially-inwardly directed, free face 27 of the fillet. These corners of the section, in the absence of the fillet, due to the otherwise concave inner surface of the section 14 between the vent holes 16 are at the greatest distance from the neutral axis NA of the section 34 and therefore carry the maximum stress. This is particularly undesirable since the corners are thin and the initiation of a crack is liable to cause propagation thereof and ultimate premature fracture of the wheel.

Figure 4:
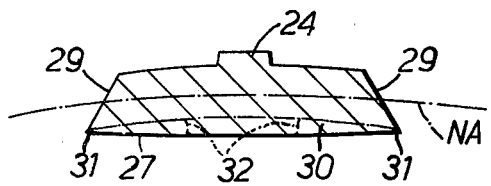
FIG. 4 is a section on the line IV—IV of FIG. 3.
Figure 11:
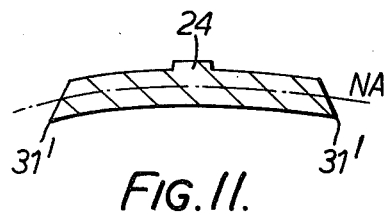
FIG. 11 is a section similar to that of FIG. 10 but not constructed in accordance with the invention.

FIG. 11 is a section similar to FIG. 4, but of a wheel without fillets. As will be readily appreciated the corners 31$^1$ are more remote from the neutral axis NA than any other part of the section and since a sharp corner is involved the high stress will be particularly likely to cause cracks as a result of casting imperfections.

The fillets 30 ensure that the maximum stress does not occur at these section corners 31 where notches and other irregularities may exist as a result of the casting process. It is therefore essential that the free face of the fillet 30 be at a greater distance from the neutral axis of the section than are the corners 31 of the section defining the vent holes 16. A further advantage of the incorporation of the fillets is that the neutral axis is moved so as to reduce the intensity of stress at the radially-inner corners 31 of the sections, defining the vent holes. In theory, it is merely necessary to provide a reinforcement 32 (indicated by broken lines) in FIGS. 2, 4 and 5 over a part of the radially-inwardly directed surface of the section but from practical considerations, in particular the casting process, each fillet is formed in this embodiment so as to extend between adjacent vent holes as indicated in chain lines FIGS. 3, 4 and 5 and does not therefore present the appearance of an upstanding ridge as does the form indicated by lines 32. The broken line form 32 is described in greater detail with reference to the modification illustrated in FIGS. 7 to 10.

Figure 3:
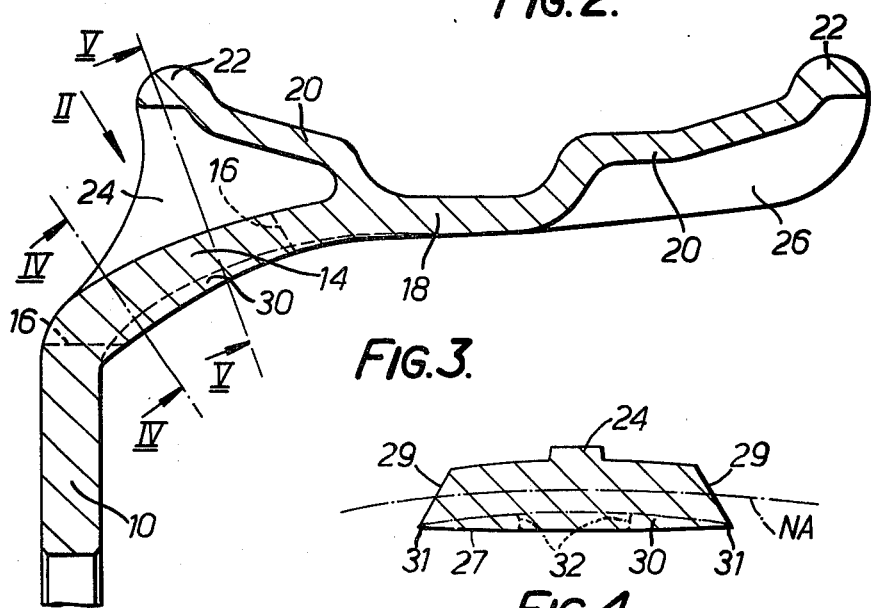
FIG. 3 is a fragmentary longitudinal section of the vehicle wheel of FIGS. 1 and 2.

As indicated in chain lines in FIG. 3, the fillet 30 tapers outwardly and symmetrically about a centre line CL extending between adjacent vent holes 16 and is smoothly faired at each end 33 into the body of the wheel disc 14.

The fillet is preferably symmetrical about the centre line CL to ensure balanced distribution of stress both in the fillet itself and in the base material of the local section. The ends of the fillet are preferably smoothly faired into the main body of the wheel in order to avoid stress concentrations. The symmetry of the fillets and webs 24 and 26 not only provides for a symmetrical stress pattern in all parts of the wheel, but keeps stress maxima to acceptable levels. The chain lines 34 of FIG. 2 indicating lateral boundaries of fillet 30 are shown spaced from the corresponding corners 31 of the holes 16 for the sake of illustrating the approximate breadth of the fillet, but it should be emphasized that these lines 34 will have no separate physical appearance since for the greater part of its length the fillet is bounded laterally by the corners 31 of the section defining the vent holes 16. The fillet 30 extends away from the wheel axis somewhat beyond the outermost edge of each vent hole 16, but at its end closer to the axis of the wheel terminates approximately at the innermost edge of each vent hole. The fillet tapers, as viewed from the side, i.e. as indicated in FIG. 3 by a broken line, progressively in the direction towards the well 18, but terminates abruptly where it encounters the internal face of the nave 10.

The exact dimensions of the fillet are not critical within limits determined by the expected loading, the material of the wheel and the test requirements of the particular country where the wheel is to be used. Functionally the fillet must so reduce the stress concentrations at the elements of the local cross-section corners defining the vent holes that fatigue cracks are eliminated during the expected life of the wheel. Specific dimensions are given hereinafter in relation to the second embodiment. It must be emphasized that the broken line in FIG. 3 indicating the root of the fillet is only for illustration, no line being actually present since the terminal edge of the fillet merges and is integral with the metal of the wheel either at the nave 10 or at the well 18.

Preferably the fillet 30 tapers, as viewed normally to its length, i.e. as shown in FIG. 3 at an angle in the range 5° to 35°, and the most desirable range lies between 12° and 22°.

The angle of taper of the fillet will depend upon stress calculations which are very complex, the stresses themselves varying during rotation of the wheel. In general, the shallower tapers are preferred for highly stressed wheels, but the shape of the vent holes is also a relevant factor and in general terms the taper will, in accordance with the invention, be such as to fulfil the condition that the edges of the apertures adjacent the fillets and on the opposite face to that of the webs 24 shall be nearer the neutral axis than the free face of the fillet. Preferably, the fillet is so shaped that the neutral axis NA (FIG. 4) of the section lies approximately at mid-thickness of the section thus rendering the compressive and tensile stresses symmetrical across the section. By this construction maximum stresses in the extreme elements of the section, i.e., at the corners of the section defining the vent holes are also reduced.

The reinforcement in accordance with the invention is found to be adequate to reduce sufficiently the intensity of stress locally at the edges of the section so as to avoid premature initiation of fatigue cracks.

Figure 6:
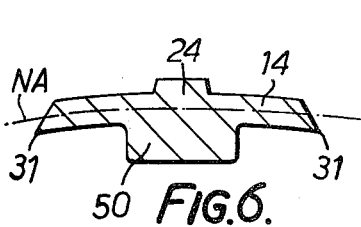
FIG. 6 is a modified section on the line IV—IV of FIG. 3.
Figure 5:
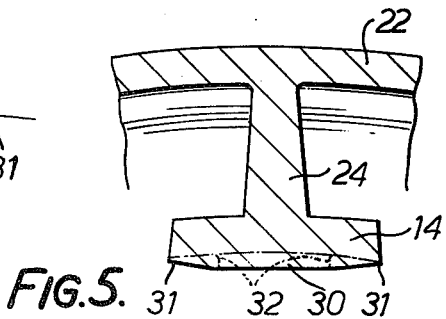
FIG. 5 is a section on the line V—V of FIG. 3.
Figure 7:
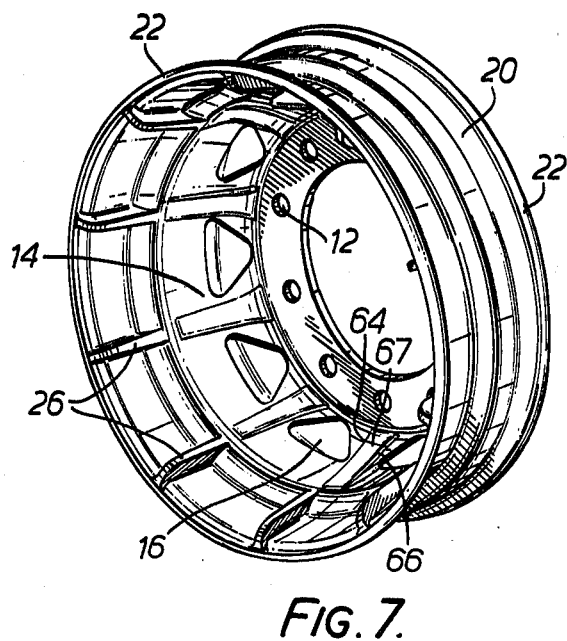
FIG. 7 is a perspective view from the inner face of a modification of a cast light alloy wheel in accordance with the invention.

By incorporating the fillet 30, it becomes possible to reduce the thickness of the material of the section 14 adjacent the fillet itself. This is illustrated in FIG. 6 from which it will be apparent that the general thickness is reduced to about one half, the fillet 50, in this modification having a substantially greater depth and having a width defined by the boundaries indicated in FIG. 2 by the broken lines 32.

An advantageous result of the use of the fillet 50 is that the metal defining the vent holes 16 becomes of less significance from the strength viewpoint. Thus, the shape and size of the vent holes 16 can be varied to a greater extent than in the construction where the material defining the holes had a significant strength purpose. It remains, of course, essential that the inwardly-directed or free face of the fillet should be further from the neutral axis of the section than the inner boundary edges of the holes.

It will be noted that each web 24 and the part of the section 14 lying between adjacent vent holes 16 forms a T-section spoke between the nave 10 and the wheel rim. Each web 24 forms the stem of a T and each fillet 34 forms part of the cross member of the T which is thicker at its middle than at its ends which lie at adjacent vent holes.

Attention will now be directed to the modification of the hereinbefore described wheel illustrated in FIGS. 7 to 10 in which similar parts will be given the same reference numerals, only the parts which differ being described in detail.

As in the main embodiment described with reference to FIGS. 1 to 5 inclusive, the wheel includes an annular nave 10 with a plurality of equally-spaced stud holes 12 and an inclined section 14 having a plurality of vent holes 16 which enable the brakes (not shown) of a vehicle to be cooled.

Figure 8:
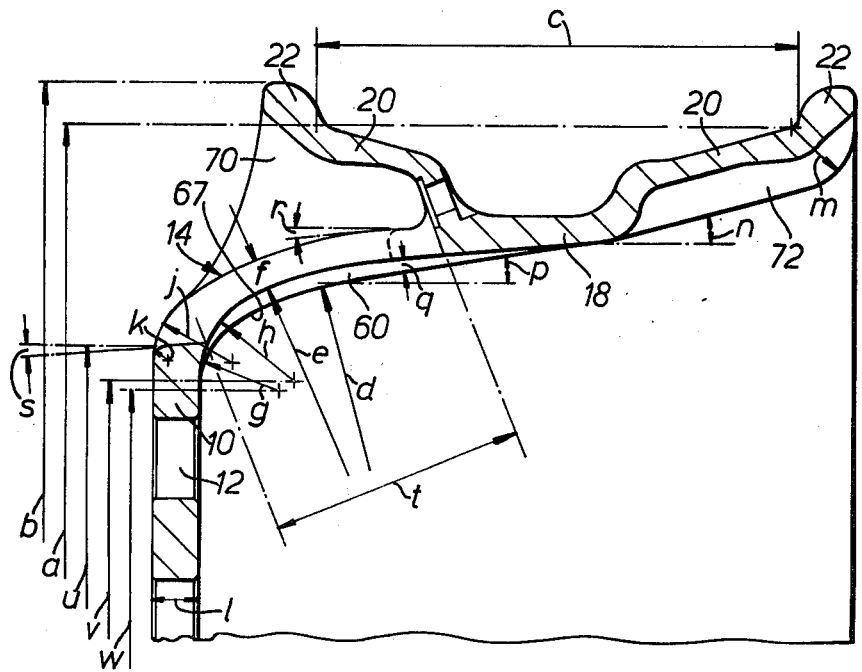
FIG. 8 is a fragmentary view of a longitudinal section of the wheel of FIG. 7.
Figure 9:
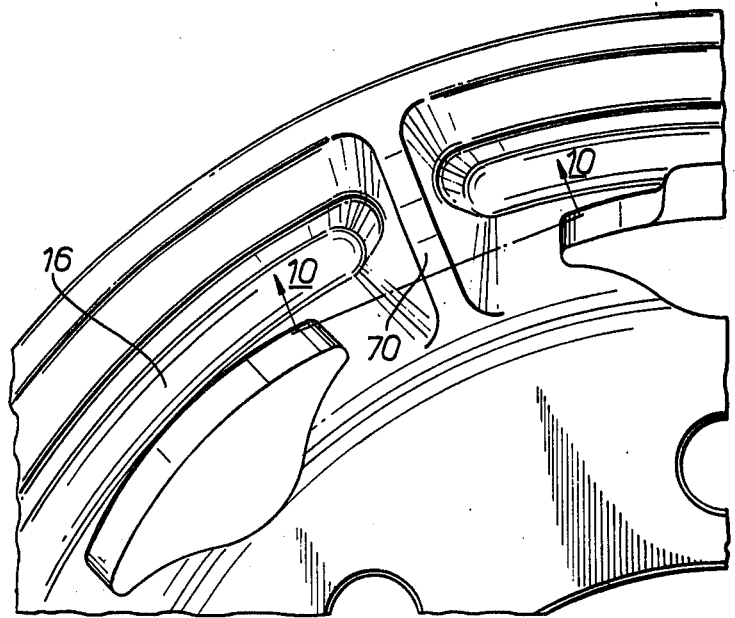
FIG. 9 is a fragmentary side elevation of the modified wheel.
Figure 10:
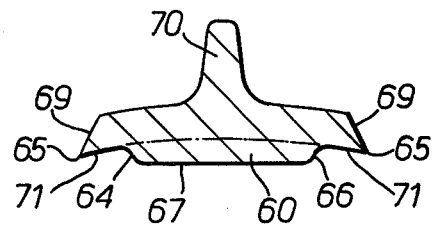
FIG. 10 is a section on the line 10—10 of FIG. 9.

In the view of FIG. 8, a fillet 60 is shown having a typical cross-section as indicated in FIG. 10. As in the main embodiment, the fillet tapers in an outwards direction and one end terminates approximately at the centre plane 62 of the wheel. A chain line 63 indicates the inward extent of the fillet (this line being included for illustration since there will actually be no line as has been previously discussed). The free face, which is directed towards the wheel axis, is denoted by reference 67.

The fillet 60 has two well-defined edges 64, 66 considered in the length direction of the fillet and as illustrated in FIG. 10 these edges are spaced from the corners 65 of the section of FIG. 10 which define the smallest opening of the vent holes 16. The corners 65 are defined by the junction of the surfaces 69, 71 as shown in FIG. 10.

The external web 70 indicated in FIG. 10 is generally similar in form to the wheel disc webs 24 of the main embodiment. The radially-inwardly facing webs 72 corresponding to the webs 26 of the main embodiment each have an inwardly-directed edge inclined at approximately 15° to the axis of the wheel. It is clear from FIG. 10 that each web 70 and the part of the section 14 between adjacent vent holes forms a T-section spoke, the web 70 forming the stem of the T and the fillet 60 forming part of the cross member of the T which is thicker at its middle than at its ends which lie at adjacent vent holes.

As for the preferred embodiment of FIGS. 1 to 5, the dimensions and the location of the fillet are such as to shift the neutral axis of the section over the whole length of the fillet so that the maximum stress is removed from the corners 65 of the section thereby substantially eliminating the risk of fatigue cracks appearing at these highly stressed corners of the section.

As discussed hereinbefore the stress analysis of wheels is extremely complex and the dimensions of the fillet 30 or 60 will depend on the overall size of the wheel, the thickness of the metal defining the wheel disc and the shape and size of the ventilation apertures. It will nevertheless be instructive to consider the dimensions of a typical wheel in accordance with the invention. The main dimensions for a wheel adapted to receive a tire 495.3 mm×152.4 mm conveniently listed in mm. as follows:

| | |
|---|---|
| a = 495.3 diameter | m = 20 radius |
| b = 520.7 diameter | n = 15° |
| c = 152.4 | p = 10° |
| d = 100 radius | q = 5° |
| e = 105 radius | r = 5° |
| f = 9 | s = 5° |
| g = 20 radius | t = 80 |
| h = 30 radius | u = 350 diameter |
| j = 25 radius | v = 330 diameter |
| k = 5 radius | w = 326 diameter |
| l = 15 | |

The modification of the FIGS. 7 to 10 has the disadvantage in practice that the casting is complicated to a minor degree and the sharpness of the corners 65 is not reduced as in the preferred embodiment of FIGS. 1 to 5.

Cast light alloy wheels have been available for use on light vehicles such as automobile and pick-up trucks for over 20 years and were proposed as long ago as 1923. Such wheels have not been applied to heavy-duty vehicles such as buses and trucks because of the difficulties involved in producing a wheel which will withstand the heavy load conditions normally involved. Furthermore, such wheels are required to undergo during their useful life many more stress reversals as a result of high mileages and the problem of producing such a wheel are complicated by these facts. Merely to make such heavy duty wheels of thicker metal will not necessarily solve the stress problems, and would defeat the objective of lighter wheels possible with light alloys.

The main embodiment hereinbefore described with reference to FIGS. 1 to 5 has been tested and found to give adequate results as indicated in the following test results, the tests having been carried out substantially in accordance with SAE J 267a (Recommended Practice)

1. Back-to-Back Rim Roll Fatigue Tests

In this test, two wheels fitted with tyres are rotated one against the other. The loading between the wheels is 1.43 times the maximum rated load of the tires and the acceptance limit for steel wheels is 5 million cycles. The results are typical of those achieved with wheels in accordance with the invention.

| Test No. | Cycles to failure | Comments |
| --- | --- | --- |
| 1 | 6,239,000 | Air leakage from rim well |
| 2 | 5,322,500 | Crack at nave marking |
| 3 | 6,993,500 | Air leakage from rim well and hand hole |
| 4 | 9,324,200 | No complete failure. Some hand and bolt hole cracks |
| 5 | 6,634,100 | Air leakage from rim well |
| 6 | 3,389,500 | Cracks at nave marking and hand hole |

If required, it would be a comparatively simple alteration to increase the section thickness in the rim well area which was a cause of failure in three of the wheels tested viz., Test Nos. 1, 3 and 5.

2. Cantilever Rotating Bending Fatigue Test

In this test, the wheel is clamped around the rim and a rotating bending moment is applied to the wheel disc. The bending moment used for the test was 1.75×rated load (0.5×rolling radius+wheel offset). This is a particularly severe level of load and the acceptance limit for steel wheels would be 500,000 cycles.

| Test No. | Cycles to failure | Comments |
| --- | --- | --- |
| 7 | 3,294,000 | Nave cracks and hand hole cracks |
| 8 | 2,125,000 | Cracks at nave markings |
| 9 | 2,971,100 | Nave cracks at nut seating edges |
| 10 | 3,220,000 | Cracks at nave markings |

Cast light alloy wheels have the advantage for heavy duty vehicles over forged light alloy wheels that they are less costly to produce largely because of the very high costs involved in tools used in forging, and further it is possible with casting to vary the design to give a greater range of choice to vehicle designers.

A further advantage of cast light alloy wheels in accordance with the invention, is that it is possible to use light alloys with higher corrosion resistance than those used for forged wheels.

Wheels embodying the invention are particularly of value when in use in heavy lorries or trucks and also in buses or coaches. The invention, can however also be applied to light vehicle wheels. Examples of wheels to which the invention can be applied with particular advantage are 20×7.50, 22×7.50, 20×8.00, 22.5×7.50, 22.5×8.25, 24.50×7.50. It will be apparent therefore that the invention is applicable to wheels of very large size and if such wheels are incorporated in vehicles having say eighteen wheels, the overall saving in weight in relation to corresponding steel wheels may be as much as 800 lb. While the weight saving in relation to the tare weight may not be a high percentage it nevertheless enables extra pay-load to be carried without any increased power consumption or road-loading. Wheels in accordance with the invention have a further advantage in that they can readily be manufactured by die-casting techniques in which molten metal is fed from the centre of the wheel and, owing to the provision of the fillets, flow of molten metal to the well and the outer beads is facilitated.

The advantages of wheels in accordance with the invention can be summarized as follows:

(a) that the weight of the wheels can be reduced by a factor of between 45% and 50% of a corresponding sized steel wheel;

(b) that the wheels can be made by the die-casting technique;

(c) that the external appearance of the wheels is not affected and, indeed can be enhanced;

(d) that ventilation of the brakes is not impeded;

(e) that the true running of the wheel is enhanced with consequent increased tire life;

(f) that the additional metal in the fillets assists the flow of metal into the rim of the wheel during casting.

I claim:

1. A cast vehicle wheel comprising:
  a wheel centre comprising a nave having apertures to enable the wheel to be secured to a vehicle hub, and an inclined section extending generally outwardly from the nave and consisting essentially of T-section spokes separated by vent holes; and
  a rim portion having a well extending from the outer periphery of said inclined section and
  two tire bead seat portions spaced apart by the well;
  each said T-section spoke comprising a web extending between the outer face of said inclined section and the adjacent one of the said tyre bead seat portions, said web forming the stem of the T and, forming part of the cross-member of the T,
  an integral fillet located on the inner face of said inclined section so that the cross-member of the T is thicker at its middle than at its ends which are located at two adjacent vent holes.

2. A wheel according to claim 1 wherein each fillet tapers outwardly away from the rotational axis of the wheel.

3. A wheel according to claim 1 comprising a further plurality of webs extending radially inwardly from the bead seat portion opposite to the bead seat portion associated with the first-mentioned webs.

4. A wheel according to claim 1 wherein each fillet spans the distance between adjacent vent holes, at least over a part of its length.

* * * * *